(12) United States Patent
Venugopal et al.

(10) Patent No.: US 11,373,131 B1
(45) Date of Patent: Jun. 28, 2022

(54) AUTOMATICALLY IDENTIFYING AND CORRECTING ERRONEOUS PROCESS ACTIONS USING ARTIFICIAL INTELLIGENCE TECHNIQUES

(71) Applicant: Dell Products L.P., Round Rock, TX (US)

(72) Inventors: Lokesh Venugopal, Georgetown, TX (US); Christina White, Leander, TX (US); Anushmita Roy Choudhury, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/154,326

(22) Filed: Jan. 21, 2021

(51) Int. Cl.
*G06Q 10/06* (2012.01)
*G06N 20/00* (2019.01)
*G06F 40/44* (2020.01)

(52) U.S. Cl.
CPC ....... *G06Q 10/06375* (2013.01); *G06F 40/44* (2020.01); *G06N 20/00* (2019.01); *G06Q 10/0633* (2013.01); *G06Q 10/06395* (2013.01)

(58) Field of Classification Search
None
See application file for complete search history.

(56) References Cited

U.S. PATENT DOCUMENTS

| | | | |
|---|---|---|---|
| 9,710,122 B1 * | 7/2017 | Pillay | G06F 3/048 |
| 10,078,683 B2 | 9/2018 | Sensharma | |

(Continued)

FOREIGN PATENT DOCUMENTS

| | | | | |
|---|---|---|---|---|
| CA | 3042921 A1 * | 11/2019 | ......... | G06F 16/9038 |
| WO | WO-2005055000 A2 * | 6/2005 | ............... | G06N 5/04 |

(Continued)

OTHER PUBLICATIONS

Lee, Chung-Hong, and Tzan-Feng Chien. "Leveraging microblogging big data with a modified density-based clustering approach for event awareness and topic ranking." Journal of Information Science 39.4 (2013): 523-543. (Year: 2013).*

(Continued)

*Primary Examiner* — Brian M Epstein
*Assistant Examiner* — Derick J Holzmacher
(74) *Attorney, Agent, or Firm* — Ryan, Mason & Lewis, LLP (57) ABSTRACT

Methods, apparatus, and processor-readable storage media for automatically identifying and correcting erroneous process actions using artificial intelligence techniques are provided herein. An example computer-implemented method includes discovering, during execution of a given process, one or more process action variants by processing data related to the given process using at least a first set of artificial intelligence techniques; categorizing at least a portion of the discovered process action variants into one or more groups based at least in part on historical process-related data and at least one density-based clustering algorithm; determining at least one resolution action in response to at least a portion of the one or more discovered process action variants by processing data pertaining to the one or more groups using at least a second set of artificial intelligence techniques; and performing the at least one determined resolution action.

20 Claims, 8 Drawing Sheets

(56) References Cited

U.S. PATENT DOCUMENTS

| | | | |
|---|---|---|---|
| 10,135,698 B2* | 11/2018 | Groenendijk | H04L 41/5038 |
| 10,394,691 B1* | 8/2019 | Cole | G06F 11/079 |
| 10,417,644 B2* | 9/2019 | Walthers | G06Q 30/016 |
| 10,685,359 B2* | 6/2020 | Walthers | G06F 16/24578 |
| 11,055,405 B1* | 7/2021 | Jin | H04L 63/1425 |
| 11,169,506 B2* | 11/2021 | Arashanipalai | G06N 5/02 |
| 2009/0063387 A1* | 3/2009 | Beaty | G06N 5/04 706/50 |
| 2013/0325877 A1* | 12/2013 | Niazi | G06Q 30/0203 707/736 |
| 2014/0279718 A1* | 9/2014 | Southey | G06N 5/04 706/11 |
| 2015/0195406 A1* | 7/2015 | Dwyer | G06F 40/279 379/265.07 |
| 2015/0317337 A1* | 11/2015 | Edgar | G16H 50/70 707/751 |
| 2016/0087856 A1* | 3/2016 | Groenendijk | H04L 41/5035 370/242 |
| 2017/0262360 A1* | 9/2017 | Kochura | G06F 11/3688 |
| 2018/0268258 A1* | 9/2018 | Tapia | G06F 15/76 |
| 2018/0322508 A1* | 11/2018 | Walthers | G06F 40/186 |
| 2018/0322509 A1* | 11/2018 | Walthers | G06F 40/279 |
| 2018/0365700 A1* | 12/2018 | Walthers | G06F 16/24578 |
| 2019/0347148 A1* | 11/2019 | Gomes Pereira | G06K 9/623 |
| 2019/0347282 A1* | 11/2019 | Cai | G06K 9/6215 |
| 2019/0349321 A1* | 11/2019 | Cai | G06F 40/237 |
| 2019/0356553 A1* | 11/2019 | Mermoud | H04L 41/5019 |
| 2020/0104401 A1* | 4/2020 | Burnett | G06F 16/287 |
| 2020/0104402 A1* | 4/2020 | Burnett | G06F 16/24568 |
| 2020/0117734 A1* | 4/2020 | Sylos | G06F 11/0709 |
| 2020/0134421 A1* | 4/2020 | Suthar | G08B 21/182 |
| 2020/0162341 A1* | 5/2020 | Vasseur | G06N 3/0472 |
| 2020/0210269 A1 | 7/2020 | Carver | |
| 2020/0342032 A1* | 10/2020 | Subramaniam | G06N 20/00 |
| 2020/0409339 A1* | 12/2020 | Arashanipalai | G06F 16/906 |
| 2021/0049700 A1* | 2/2021 | Nguyen | G06N 3/08 |
| 2021/0081819 A1* | 3/2021 | Polleri | G06N 3/006 |
| 2021/0081848 A1* | 3/2021 | Polleri | G06K 9/6259 |
| 2021/0089860 A1* | 3/2021 | Heere | G06N 20/00 |
| 2021/0384761 A1* | 12/2021 | Menzel | H02J 3/0012 |
| 2021/0392156 A1* | 12/2021 | Singh | G06N 20/00 |

FOREIGN PATENT DOCUMENTS

| | | | | |
|---|---|---|---|---|
| WO | WO-2005060684 A2 * | 7/2005 | | G06F 17/30684 |
| WO | WO-2007073515 A2 * | 6/2007 | | G06F 16/9032 |
| WO | WO-2020092956 A1 * | 5/2020 | | G06F 11/3006 |

OTHER PUBLICATIONS

Haanpää, Aki. Applying Natural Language Processing In Text Based Supplier Discovery. MS thesis. 2019. (Year: 2019).*

Yang, Lin, et al. "Semi-supervised log-based anomaly detection via probabilistic label estimation." 2021 IEEE/ACM 43rd International Conference on Software Engineering (ICSE). IEEE, 2021. (Year: 2021).*

Juhnke, Katharina, Alexander Nikic, and Matthias Tichy. "Clustering Natural Language Test Case Instructions as Input for Deriving Automotive Testing DSLs." J. Object Technol 20.3 (2021): 1-14. (Year: 2021).*

* cited by examiner

AUTOMATICALLY IDENTIFYING AND CORRECTING ERRONEOUS PROCESS ACTIONS USING ARTIFICIAL INTELLIGENCE TECHNIQUES

FIELD

The field relates generally to information processing systems, and more particularly to techniques for managing processes in such systems.

BACKGROUND

Process errors present challenges in many enterprises, and typically only grow with scale. For example, process errors in connection with a sales team or department within a given enterprise can result in lower margins, delayed revenue, or even loss of sales. Data errors, missed tasks, and/or incorrectly linked records represent common examples of process errors that can result in significant detrimental effects. However, conventional process management techniques often include complex manual identification and response efforts carried out by specialized personnel, tasks which are resource-intensive and error-prone.

SUMMARY

Illustrative embodiments of the disclosure provide techniques for automatically identifying and correcting erroneous process actions using artificial intelligence (AI) techniques. An exemplary computer-implemented method includes discovering, during execution of a given process, one or more process action variants by processing data related to the given process using at least a first set of one or more artificial intelligence techniques. The method also includes categorizing at least a portion of the one or more discovered process action variants into one or more groups based at least in part on historical process-related data and at least one density-based clustering algorithm. Additionally, the method includes determining at least one resolution action in response to at least a portion of the one or more discovered process action variants by processing data pertaining to the one or more groups using at least a second set of one or more artificial intelligence techniques. Further, the method also includes performing the at least one determined resolution action.

Illustrative embodiments can provide significant advantages relative to conventional process management techniques. For example, problems associated with resource-intensive and error-prone complex manual identification and response efforts carried out by specialized personnel are overcome in one or more embodiments through automatically identifying and correcting erroneous process actions using artificial intelligence techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
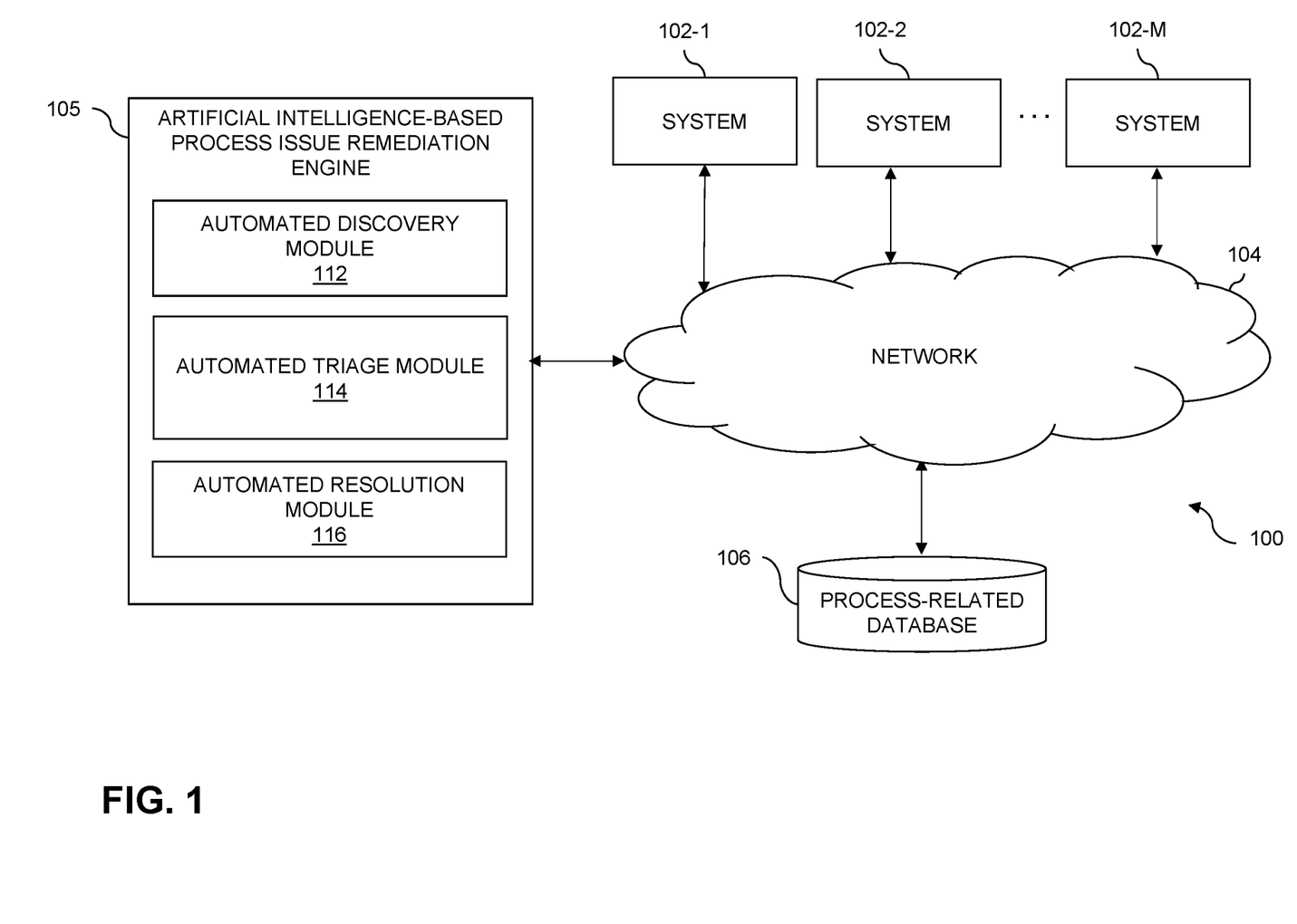
FIG. 1 shows an information processing system configured for automatically identifying and correcting erroneous process actions using artificial intelligence techniques in an illustrative embodiment.

FIG. 1 shows a computer network (also referred to herein as an information processing system) 100 configured in accordance with an illustrative embodiment. The computer network 100 comprises a plurality of systems 102-1, 102-2, . . . 102-M, collectively referred to herein as systems 102. The systems 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is AI-based process issue remediation engine 105.

The systems 102 may include, for example, customer relationship management systems, business operations management systems, cloud-based systems, storage systems, etc., wherein such systems can comprise mobile telephones, laptop computers, tablet computers, desktop computers or other types of computing devices. Such devices are examples of what are more generally referred to herein as "processing devices." Some of these processing devices are also generally referred to herein as "computers."

The systems 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, AI-based process issue remediation engine 105 can have an associated database 106 configured to store data pertaining to various processes, which comprise, for example, process interaction data, user/customer sentiment data, historical data pertaining to outputs, issues, and remediation attempts, etc.

The database 106 in the present embodiment is implemented using one or more storage systems associated with AI-based process issue remediation engine 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with AI-based process issue remediation engine 105 can be one or more input-output devices, which illustratively comprise keyboards, displays or other types of input-output devices in any combination. Such input-output devices can be used, for example, to support one or more user interfaces to AI-based process issue remediation engine 105, as well as to support communication between AI-based process issue remediation engine 105 and other related systems and devices not explicitly shown.

Additionally, AI-based process issue remediation engine 105 in the FIG. 1 embodiment is assumed to be implemented using at least one processing device. Each such processing device generally comprises at least one processor and an associated memory, and implements one or more functional modules for controlling certain features of AI-based process issue remediation engine 105.

More particularly, AI-based process issue remediation engine 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows AI-based process issue remediation engine 105 to communicate over the network 104 with systems 102, and illustratively comprises one or more conventional transceivers.

The AI-based process issue remediation engine 105 further comprises an automated discovery module 112, an automated triage module 114, and an automated resolution module 116.

It is to be appreciated that this particular arrangement of modules 112, 114, and 116 illustrated in the AI-based process issue remediation engine 105 of the FIG. 1 embodiment is presented by way of example only, and alternative arrangements can be used in other embodiments. For example, the functionality associated with modules 112, 114, and 116 in other embodiments can be combined into a single module, or separated across a larger number of modules. As another example, multiple distinct processors can be used to implement different ones of modules 112, 114, and 116 or portions thereof.

At least portions of modules 112, 114, and 116 may be implemented at least in part in the form of software that is stored in memory and executed by a processor.

It is to be understood that the particular set of elements shown in FIG. 1 for automatically identifying and correcting erroneous process actions using artificial intelligence techniques involving systems 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, AI-based process issue remediation engine 105 and process-related database 106 can be on and/or part of the same processing platform.

An exemplary process utilizing modules 112, 114, and 116 of an example AI-based process issue remediation engine 105 in computer network 100 will be described in more detail with reference to the flow diagram of FIG. 6.

Accordingly, at least one embodiment includes automatically identifying and correcting erroneous process actions using AI techniques. For example, such an embodiment can include implementing a dynamic process validator and self-healing AI model, which constitutes an integrated AI platform that combines human, automated, and user-related inputs (including, for example, user-related natural language processing (NLP) generated inputs) to automatically identify erroneous process actions and correct such erroneous actions (e.g., in approximately real-time). Such an embodiment includes building on the designed process in question, and leveraging knowledge of triaging and correction that the AI model learns throughout the lifetime of the process.

As further detailed herein, in one or more embodiments, as-performed process data are layered upon the designed process to identify frequent and infrequent variants. Such identified information provides at least a portion of foundational input for one or more AI techniques to build upon, enabling such AI techniques to evolve to react automatically and provide increasing insights into potential process issues that may arise.

As also illustrated and described herein, a dynamic process intelligence and self-healing system and/or model can include multiple modules such as, for example, an automated discovery module (which carries out conformance and variant analysis), an automated triage module (which carries out alerting and triage tasks with intelligent tracking), and a resolution module (which carries out at least one automated remedial action).

In accordance with at least one embodiment, in one stage of implementation of the AI engine, an automated discovery module actively monitors the executed process. The as-designed system execution model, along with allowed and accepted process deviations and/or outliers, are known to and/or determined by the model (based, for example, on initial input and/or continued self-learning). A list and/or table of common and rare variants is automatically updated as the system processes additional data and learns more information. Direct user or customer interactions and messages are integrated and analyzed using one or more NLP techniques. In such an embodiment, using one or more NLP techniques can include implementing text classification techniques in conjunction with automated sentiment analysis to classify process variants and outliers into accepted/not accepted buckets. Further, using such NLP techniques, a discovery engine identifies one or more issues (e.g., potential wrong orders, wrong intakes, potential internal data mismatches, etc.) and effectively forecasts one or more conversion rates (e.g., conversion of sales opportunities) and potential process execution bottlenecks. The identified issues are then categorized and used to initiate an automated triage phase, as further detailed below.

Figure 2:
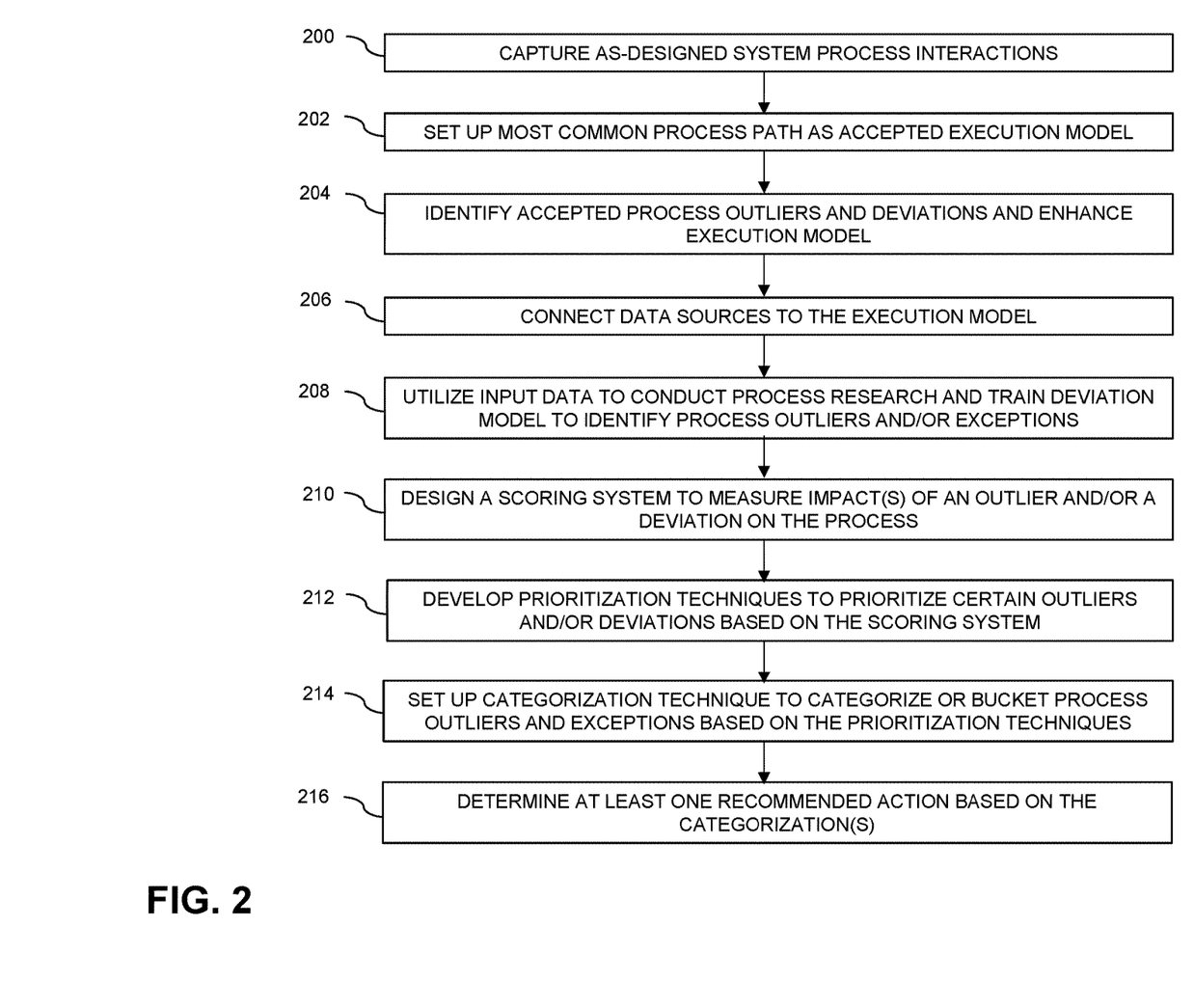
FIG. 2 shows an example automated discovery flow in an illustrative embodiment.

FIG. 2 shows an example automated discovery flow in an illustrative embodiment. Step 200 includes capturing as-designed system process interactions, and step 202 includes setting up the most common process path as the accepted execution model. In one or more embodiments, such a setting up step can be carried out by leveraging information from one or more business process experts to generate an initial process map and analyze timestamps of different systems used in the process to identify the most common path. Step 204 includes identifying accepted process outliers and deviations, and using such identified items to enhance the execution model. Step 206 includes connecting data sources (e.g., user or customer sentiment data, real-time process data, prior output data, etc.) to the execution model, and step 208 includes utilizing input data (e.g., customer sentiment data, real-time process data, prior data outputs of the execution model, etc.) to conduct process research and train at least one deviation model to identify process outliers and/or exceptions.

Step 210 includes designing a scoring system to measure the impact(s) of an outlier and/or a deviation on the process. In one or more embodiments, such a scoring system utilizes attributes such as time impact, cost to company, complexity, etc., to calculate the impact of an outlier and/or deviation. Step 212 includes developing one or more prioritization techniques to prioritize certain outliers and/or deviations based at least in part on the scoring system, and step 214 includes setting up at least one categorization technique to categorize or bucket process outliers and exceptions based at least in part on the prioritization techniques. Further, as noted in FIG. 2, step 216 includes determining at least one recommended action (e.g., an alert to an enterprise entity, a notification that triage is required, an addition to the execution model, etc.) based at least in part on the categorization (s).

As noted above and in connection with FIG. 2, one or more embodiments include implementing at least one categorization technique. In such an embodiment, for example, a density-based algorithm can be used to categorize and cluster process outliers and exceptions. Each process step will have a score associated therewith, and the final score (xi) of each process variant will be calculated based at least in part on the score of each step. The most common process path will be treated as the mean x. The standard deviation, in such an example embodiment, will be calculated using the following formula (wherein n represents the number of samples):

$$sd = \sqrt{\left(\frac{1}{n}\right)\sum_{i=1}^{n}(x_i - \bar{x})^2}$$

The z-score of each process variant can then be calculated (e.g., via $z=(x-\bar{x})/sd$), and based on the z-score, the variants will be clustered together and/or categorized. For each cluster of process variants, at least one embodiment includes identifying one or more accepted process clusters and/or mapping at least one cluster to at least one most likely issue category. In such an embodiment, identifying accepted outliers and/or variants is based on processing data input during automated discovery and thereafter also based on feedback from one or more business experts. Additionally, if the number of cases of a process variant exceeds a certain threshold, at least one embodiment can include adding the variant as an accepted variant. Once an outlier has been identified and mapped (or not mapped) to an issue category, such an output will then be sent to the triage engine, as further described below.

Accordingly, the categorized deviations/outliers are then fed to an automated triage engine or module, which assesses the discovered deviations in connection with historical process details and circumvention steps. An underlying cause or cog (as referred to by the engine and also used herein) of at least one particular discovered deviation is uncovered based at least in part on this assessment, and based at least in part on the underlying cause determination, the automated triage module makes one or more responsive determinations using a decision tree simulation engine. In at least one embodiment, an in-built decision tree simulation engine inputs various variables in conjunction with one of multiple approaches which can include circumventing the cog and eliminating the cog.

Circumventing a cog, with the cog present (as many times user inputs or expectation sets cannot be changed), includes following at least one circumvention process. Such a circumvention process can be triggered when a low-impact issue or outlier has been identified but is one that cannot be changed and/or modified, or for which no remedial action is defined. In such a scenario (i.e., in a case of circumvention), no remedial action would be carried out, no additional action is taken, and no entity is alerted. Eliminating a cog, in at least one embodiment, includes triggering at least one remedial action and/or a robotic process automation (RPA) workflow to eliminate the cog in a systematic manner. In some cases, the cog cannot easily be eliminated without impact to other parts of the process. If this is the case, one or more embodiments includes sending a notification and/or alert to the user and/or enterprise, a circumvention process will be chosen, and the user and/or enterprise will be informed of the action, as well as the original cog elimination suggestion, so that the user and/or enterprise can decide as to the feasibility of the ultimate remedial action. The selected decision (either final remedial action or circumvention-based decision) can be further simulated to determine any impact to one or more final key performance indicators (KPIs) (e.g., revenue, time to close, etc.), and the selected decision (also referred to herein as a "fix") is then fed to the resolution module or engine.

Figure 3:
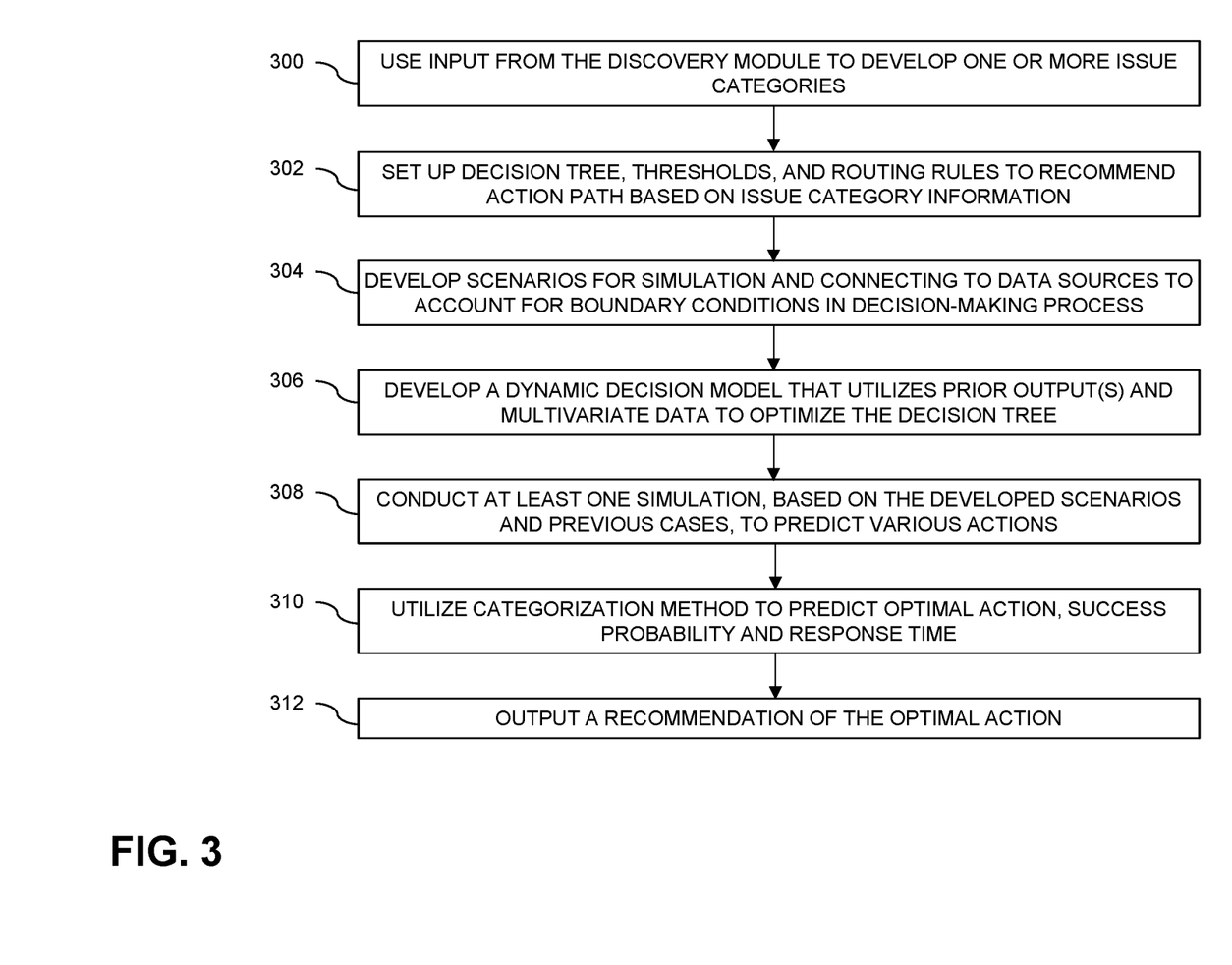
FIG. 3 shows an example automated triage flow in an illustrative embodiment.

FIG. 3 shows an example automated triage flow in an illustrative embodiment. Step 300 includes using input from the discovery module to develop issue categories, and step 302 includes setting up at least one decision tree, one or more thresholds, and one or more routing rules to recommend at least one action path based at least in part on issue category information. In one or more embodiments, an initial decision tree matches one or more common issues categories with one or more specific actions. Step 304 includes developing one or more scenarios for simulation and connecting to additional data sources (e.g., tax-related data, etc.) to account for one or more boundary conditions in the decision-making process. Step 306 includes developing a dynamic decision model that utilizes prior output(s) and multivariate data to optimize the at least one decision tree, and step 308 includes conducting at least one simulation, based on at least a portion of the developed scenarios and one or more previous cases, to predict various actions (in connection with one or more issues related to such scenarios and/or cases). Further, step 310 includes utilizing at least one categorization method to predict at least one optimal action (from the predicted set of various actions) as well as success probability and response time. In at least one embodiment, the optimal path is dependent on impact, success probability and speed of action. In such an embodiment, impact is calculated utilizing a similar scoring method similar to that developed in step 210 of FIG. 2, and the success probability is determined by calculating the probability of each step in a multi-step resolution and using that to determine a probability of success for the action. The probability of automated steps can depend on various factors such as, for example, being able to connect with target systems, not running into other technical errors, etc. For workflows which require human input, such a probability can depend on additional factors such as user response time, etc. As the model learns from its previous outputs, the probability will become more accurate. Also, the response time, as used in this context, refers to the time between when an action is initiated and when the action can be considered completed. The completed status can be defined for each resolution.

Step 312 includes outputting a recommendation of the at least one optimal action, for example, via an alert to an enterprise entity or user, and/or as an input to the resolution engine or module.

Additionally, and by way of illustration, consider an example embodiment that includes an initial decision tree wherein the inputs and the thresholds have been defined. The outcomes of the initial decision tree are fed back into the decision model, and the thresholds for each decision are refined based on the impact of the outcome(s). Scenarios wherein negative high impacts continue to be recorded may be eliminated by the decision tree as a branch.

As further detailed herein, at least one embodiment includes implementing a resolution engine, which takes input from the triage module, and carries out actions using multiple sub-engines. For example, one such sub-engine includes an in-built module that can perform corrective actions, and through an application programming interface (API) connector, can connect to other systems to perform any required changes to the process and/or related data.

By way of illustration, consider an example embodiment wherein a decision tree selects a given decision of "Sales Quick Fix." Based on the type of fix, the exact action ($Action_1$, $Action_2$, . . . $Action_n$) is selected, wherein the actions are configured based at least in part on a rule engine and can include create, read, update, and delete (CRUD) operations that will not require additional decision-making.

An additional sub-engine includes at least one RPA bot, wherein the resolution engine triggers the at least one RPA bot to perform at least one action as a typical user would do. By way of illustration, consider an example embodiment wherein a decision tree selects a given decision of "Trigger RPA Bot." Based on the type of fix, the exact action ($Action_1$, $Action_2$, . . . $Action_n$) is selected. Based on the action, a specific RPA bot is triggered which then takes input from the resolution engine and selects a specific workflow for execution. The RPA bot then executes the workflow in a way that mirrors a user (such as, for example, a sales agent of a sales system). Also, such an instruction is determined by the original, primary path for the given scenario (the one this variant deviated from) as gathered in the first phase of the module. In this manner, the RPA bot is directed, and the outcome is reliably predicted. The workflow will then be completed in the given system or application, as triggered by the AI engine, with the RPA solution following the process motion.

By way of further illustration, in at least one embodiment, a resolution engine interacts with a workflow engine by providing triggering inputs to the workflow engine. In an RPA bot scenario, for example, a larger workflow can be executed as if an agent were to proceed, while in a connection scenario, a corrective action is performed and then handed over to a sales agent to continue the process. The triage result determines which sub-engine of the resolution engine/module will be triggered. Accordingly, in such an embodiment, the AI engine automates the process from end-to-end.

Figure 4:
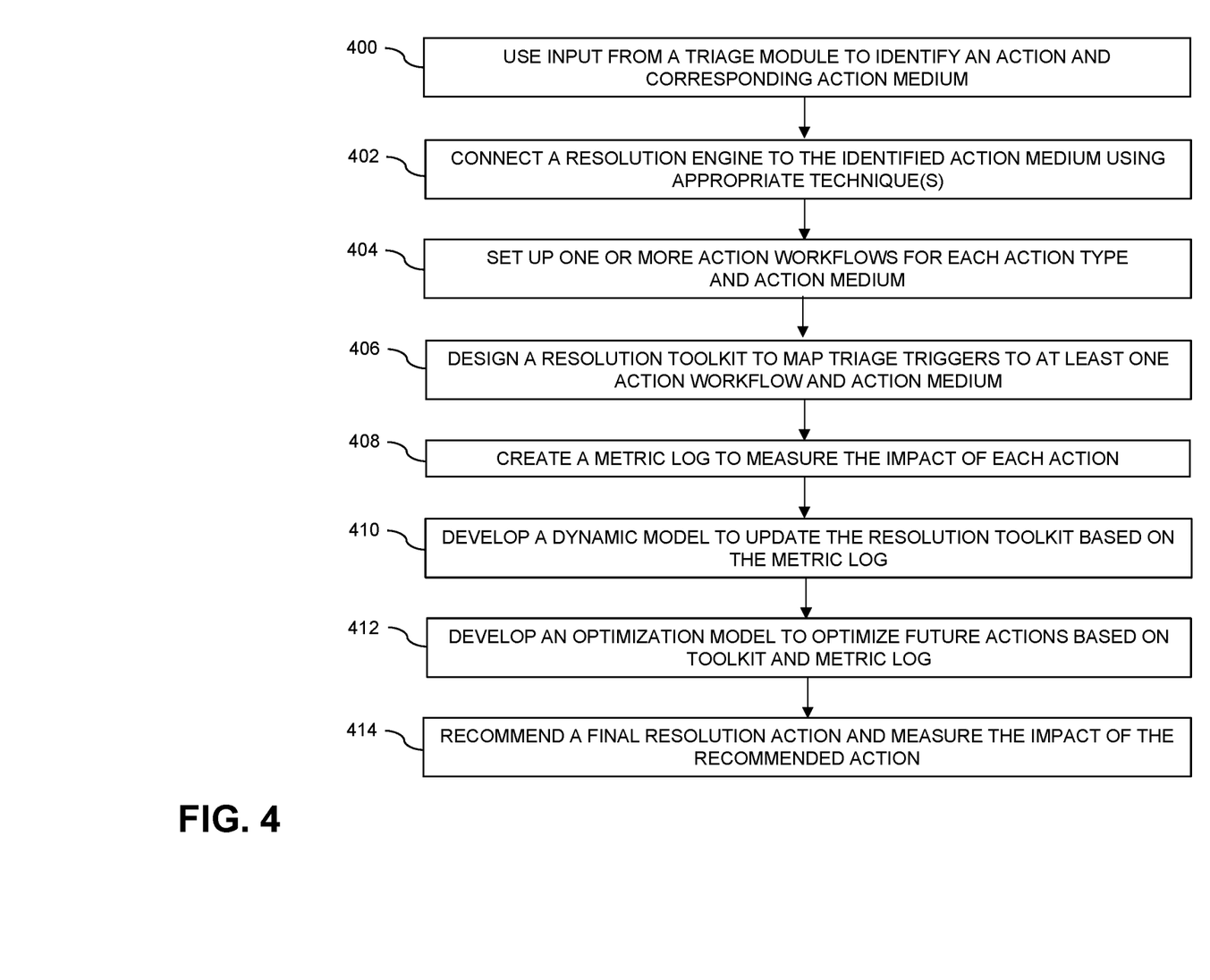
FIG. 4 shows an example automated resolution flow in an illustrative embodiment.

FIG. 4 shows an example automated resolution flow in an illustrative embodiment. Step 400 includes using input(s) from a triage module to identify an action and at least one corresponding action medium. Such an action medium can include, for example, an API connector which performs CRUD operations and/or one or more external RPAs which execute one or more complex workflows. Step 402 includes connecting a resolution engine to the identified action medium using at least one appropriate technique (e.g., via an API connector, via triggering one or more external systems, etc.). Step 404 includes setting up one or more action workflows for each action type and action medium, while step 406 includes designing a resolution toolkit to map triage triggers to at least one action workflow and action medium. In at least one embodiment, such a toolkit includes the action medium, the workflow, and the triggers for the action medium. Such a toolkit can be designed, for example, during an initial setup, and refined using feedback in connection with discovery and triage actions, along with input from customers and/or users.

Additionally, step 408 includes creating a metric log to measure the impact of each action, and step 410 includes developing a dynamic model to update the resolution toolkit based at least in part on the metric log. Step 412 includes developing an optimization model to optimize future actions based at least in part on the toolkit and the metric log, and step 414 includes recommending a final resolution action (to an enterprise and/or user) and measuring the impact of the recommended action (e.g., the monetary impact).

Figure 5:
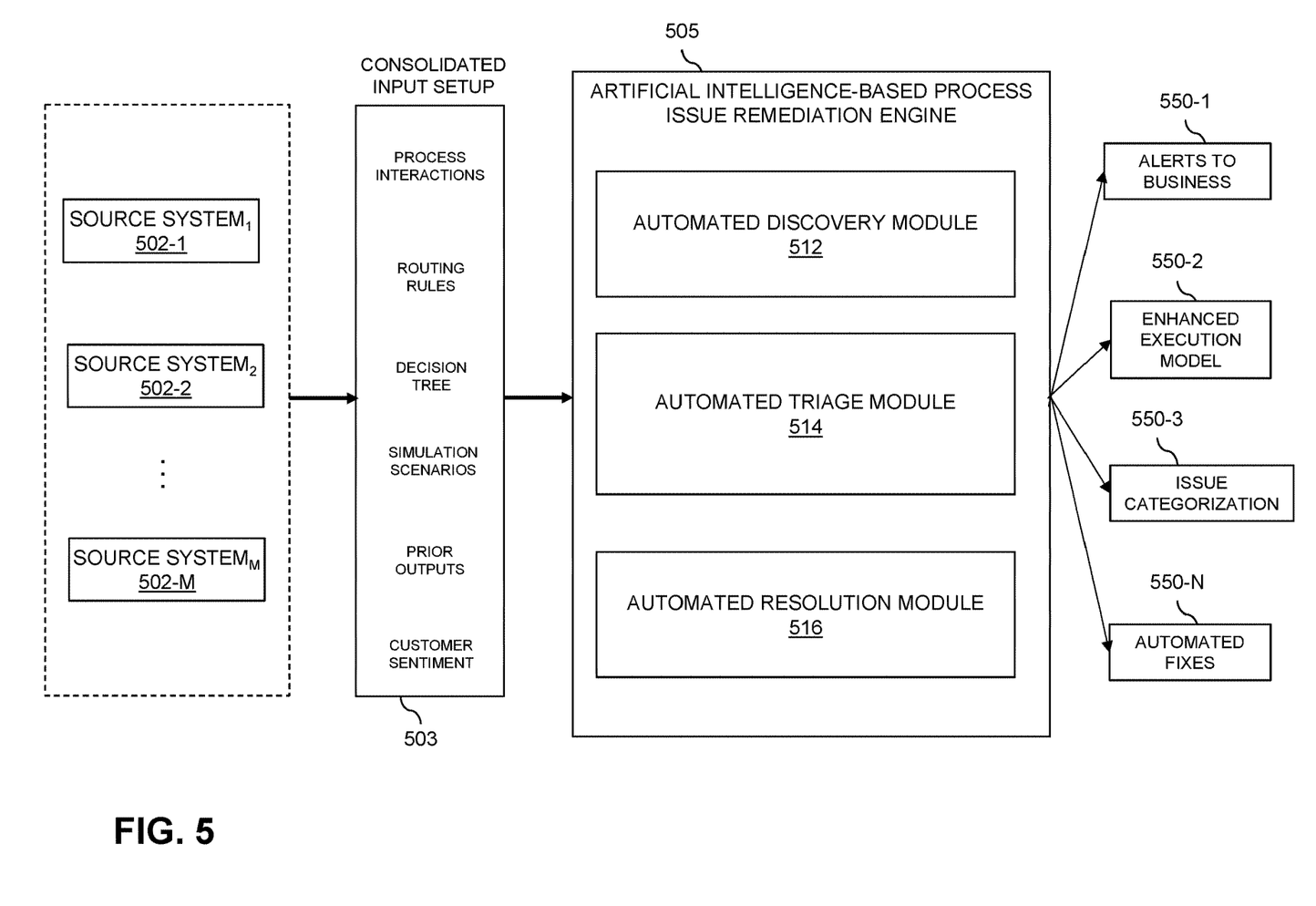
FIG. 5 shows an information processing system configured for automatically identifying and correcting erroneous process actions using artificial intelligence techniques in an illustrative embodiment.

FIG. 5 shows an information processing system configured for automatically identifying and correcting erroneous process actions using artificial intelligence techniques in an illustrative embodiment. By way of illustration, FIG. 5 depicts a set of inter-connected source systems 502-1, 502-2, . . . 502-M (collectively referred to herein as source systems 502), which provide and/or generate inputs. Such inputs are processed via a consolidated input setup 503, which can include identifying and/or analyzing process interactions, determining one or more routing rules, generating and/or implementing a decision tree, developing one or more simulation scenarios, identifying and/or analyzing prior outputs, and identifying and/or analyzing user/customer sentiment data. As depicted in FIG. 5, such processed inputs are provided to AI-based process issue remediation engine 505, which, utilizing modules 512, 514, and 516, generates various outputs (collectively referred to herein as outputs 550) including one or more alerts (to users and/or enterprise entities) 550-1, an enhanced execution model 550-2, issue categorization information 550-3, and one or more automated remedial or corrective actions 550-N (also referred to herein as fixes).

As detailed herein, one or more embodiments include combining AI techniques and process improvement(s) to determine and/or implement self-correction actions for automated triggers on failure themes against at least one self-adjusting, dynamic threshold. As also described herein, such an embodiment can include integrating NLP and/or machine learning (ML) techniques with process analysis of system activities in connection with automatically performing course correction(s) for one or more processes in question.

Figure 6:
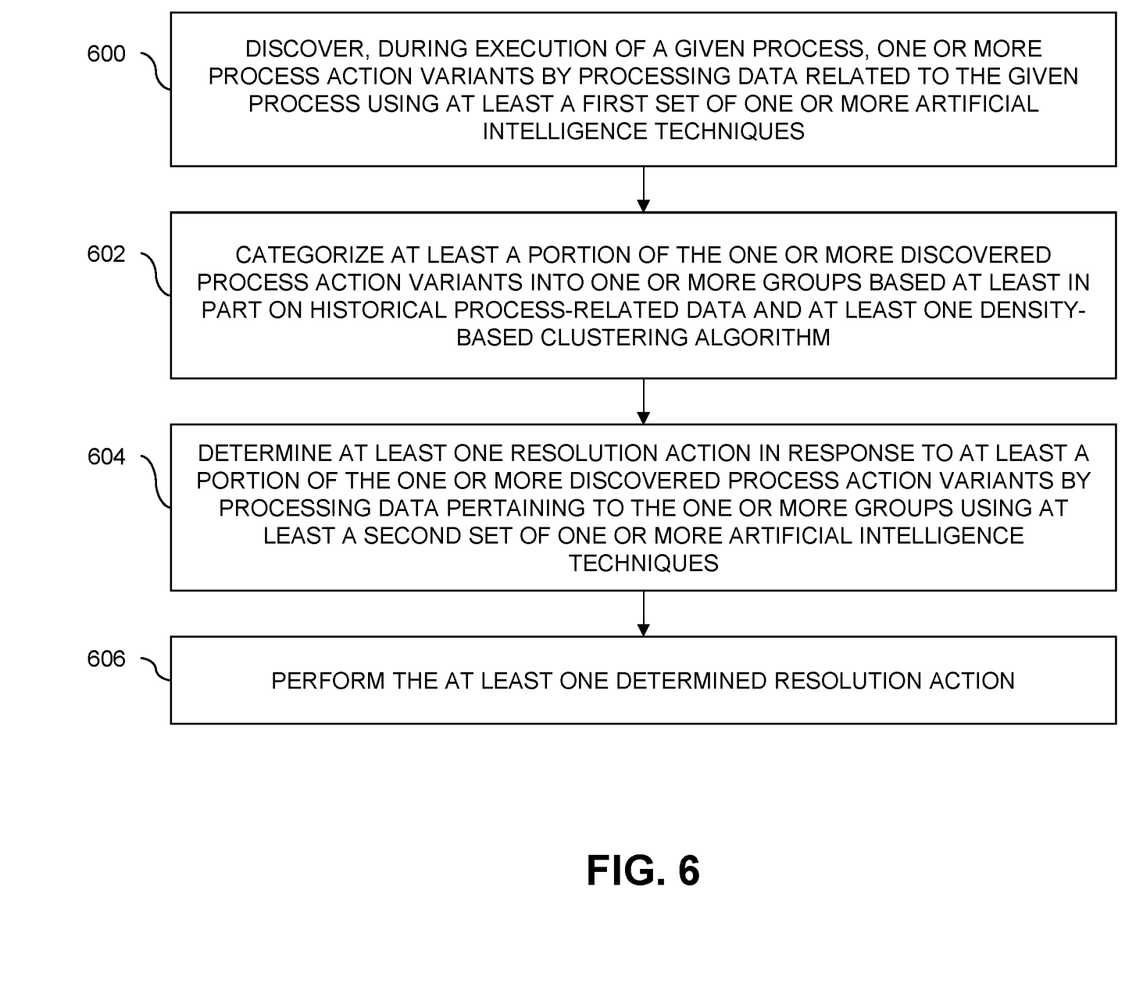
FIG. 6 is a flow diagram of a process for automatically identifying and correcting erroneous process actions using artificial intelligence techniques in an illustrative embodiment.

FIG. 6 is a flow diagram of a process for automatically identifying and correcting erroneous process actions using artificial intelligence techniques in an illustrative embodiment. It is to be understood that this particular process is only an example, and additional or alternative processes can be carried out in other embodiments.

In this embodiment, the process includes steps 600 through 606. These steps are assumed to be performed by the AI-based process issue remediation engine 105 utilizing its modules 112, 114, and 116.

Step 600 includes discovering, during execution of a given process, one or more process action variants by processing data related to the given process using at least a first set of one or more artificial intelligence techniques. In at least one embodiment, processing data related to the given process using at least a first set of one or more artificial intelligence techniques includes processing, using one or more artificial intelligence-based natural language processing techniques, at least one of data pertaining to user interactions with the given process and data pertaining to user messages associated with the given process. Also, in one or more embodiments, discovering one or more process action variants includes monitoring the execution of the given process and comparing monitored execution-related data to a predetermined execution model and information pertaining to one or more accepted process action variants.

Step 602 includes categorizing at least a portion of the one or more discovered process action variants into one or more groups based at least in part on historical process-related data and at least one density-based clustering algorithm. In at least one embodiment, categorizing at least a portion of the one or more discovered process action variants includes forecasting one or more key performance indicators in conjunction with the one or more discovered process action variants. Step 604 includes determining at least one resolution action in response to at least a portion of the one or more discovered process action variants by processing data pertaining to the one or more groups using at least a second set of one or more artificial intelligence techniques. In at least one embodiment, determining at least one resolution action includes determining, for at least a portion of the one or more discovered process action variants, at least one root cause and at least one corresponding impact. In such an embodiment, processing data pertaining to the one or more groups using at least a second set of one or more artificial intelligence techniques includes processing data pertaining to at least a portion of the at least one determined root cause and data pertaining to at least a portion of the at least one corresponding impact using at least one artificial intelligence-based decision tree simulation engine. Additionally, in such an embodiment, determining at least one resolution action includes identifying at least one resolution action determined by the at least one artificial intelligence-based decision tree simulation engine, wherein the at least one resolution action comprises one of at least one variant circumvention action and at least one variant elimination action.

Step 606 includes performing (for example, during execution of the given process) the at least one determined resolution action (wherein the resolution action comprises one or more automated actions). In one or more embodiments, performing the at least one determined resolution action includes automatically carrying out the at least one determined resolution action using at least one application programming interface connector in conjunction with at least one system related to the given process. Additionally or alternatively, performing the at least one determined resolution action can include triggering robotic process automation bot to execute at least one workflow, related to the at least one determined resolution action, on at least one system related to the given process. Further, in at least one embodiment, performing the at least one determined resolution action can include outputting at least one alert related to the at least one determined resolution action to at least one of one or more users and one or more enterprise entities.

The techniques depicted in FIG. 6 can also include training at least the second set of one or more artificial intelligence techniques based at least in part on the at least one determined resolution action and data pertaining to at least one outcome of performing the at least one determined resolution action.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically identify and correct erroneous process actions using artificial intelligence techniques. These and other embodiments can effectively overcome problems associated with resource-intensive and error-prone complex manual identification and response efforts carried out by specialized personnel.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
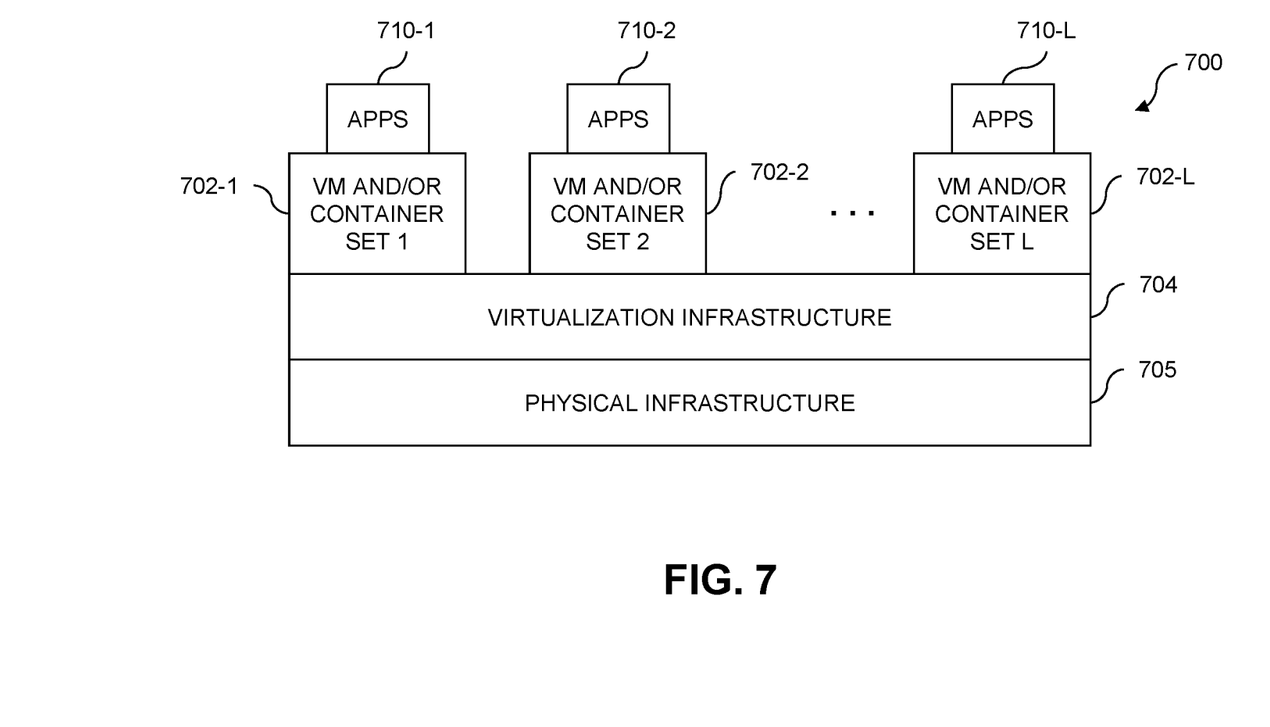
FIGS. 7 and 8 show examples of processing platforms that may be utilized to implement at least a portion of an information processing system in illustrative embodiments.
Figure 8:
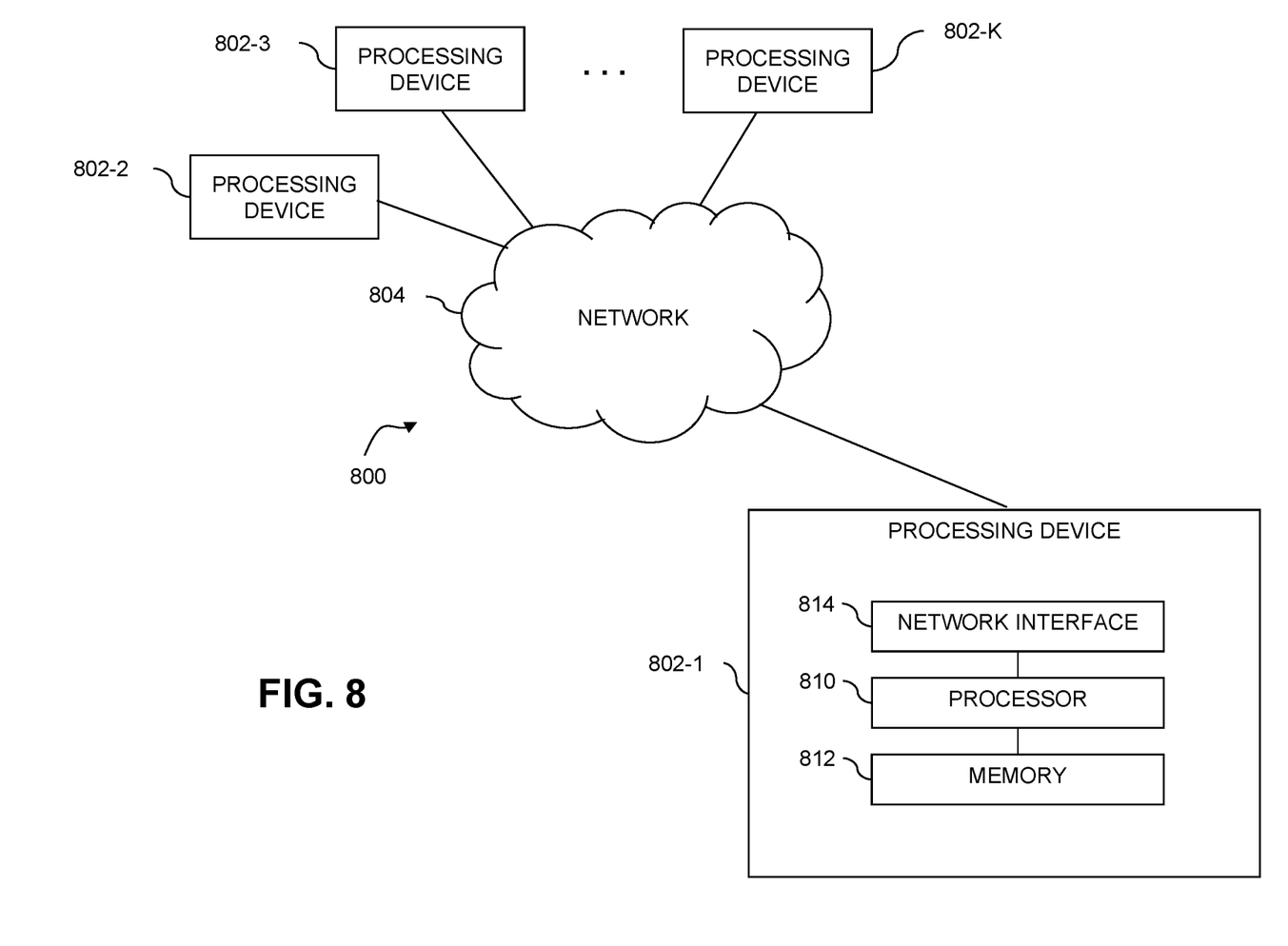

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   discovering, during execution of a given process, one or more process action variants by processing data related to the given process using at least a first set of one or more artificial intelligence techniques;
   categorizing at least a portion of the one or more discovered process action variants into one or more groups based at least in part on historical process-related data and at least one density-based clustering algorithm, wherein the at least one density-based clustering algorithm comprises (i) scoring each of the one or more discovered process action variants based at least in part on a score associated with each step related to the given discovered process action variant, (ii) generating a z-score for each of the one or more discovered process action variants based at least in part on the score of each of the one or more discovered process action variants and at least one standard deviation calculation, and (iii) clustering at least a portion of the one or more discovered process action variants based at least in part on the z-score for each of the one or more discovered process action variants;
   determining at least one resolution action in response to at least a portion of the one or more discovered process action variants by processing data pertaining to the one or more groups using at least a second set of one or more artificial intelligence techniques;
   performing the at least one determined resolution action; and
   automatically training at least the second set of one or more artificial intelligence techniques based at least in part on the at least one determined resolution action and data pertaining to at least one outcome of performing the at least one determined resolution action;
   wherein the method is performed by at least one processing device comprising a processor coupled to a memory.

2. The computer-implemented method of claim 1, wherein processing data related to the given process using at least a first set of one or more artificial intelligence techniques comprises processing, using one or more artificial intelligence-based natural language processing techniques, at least one of data pertaining to user interactions with the given process and data pertaining to user messages associated with the given process.

3. The computer-implemented method of claim 1, wherein determining at least one resolution action comprises determining, for at least a portion of the one or more discovered process action variants, at least one root cause and at least one corresponding impact.

4. The computer-implemented method of claim 3, wherein processing data pertaining to the one or more groups using at least a second set of one or more artificial intelligence techniques comprises processing data pertaining to at least a portion of the at least one determined root cause and data pertaining to at least a portion of the at least one corresponding impact using at least one artificial intelligence-based decision tree simulation engine.

5. The computer-implemented method of claim 4, wherein determining at least one resolution action comprises identifying at least one resolution action determined by the at least one artificial intelligence-based decision tree simulation engine, wherein the at least one resolution action comprises one of at least one variant circumvention action and at least one variant elimination action.

6. The computer-implemented method of claim 1, wherein performing the at least one determined resolution action comprises automatically carrying out the at least one determined resolution action using at least one application programming interface connector in conjunction with at least one system related to the given process.

7. The computer-implemented method of claim 1, wherein performing the at least one determined resolution action comprises triggering at least one robotic process automation bot to execute at least one workflow, related to the at least one determined resolution action, on at least one system related to the given process.

8. The computer-implemented method of claim 1, wherein discovering one or more process action variants comprises monitoring the execution of the given process and comparing monitored execution-related data to a predetermined execution model and information pertaining to one or more accepted process action variants.

9. The computer-implemented method of claim 1, wherein categorizing at least a portion of the one or more discovered process action variants comprises forecasting one or more key performance indicators in conjunction with the one or more discovered process action variants.

10. The computer-implemented method of claim 1, wherein performing the at least one determined resolution action comprises outputting at least one alert related to the at least one determined resolution action to at least one of one or more users and one or more enterprise entities.

11. A non-transitory processor-readable storage medium having stored therein program code of one or more software programs, wherein the program code when executed by at least one processing device causes the at least one processing device:
to discover, during execution of a given process, one or more process action variants by processing data related to the given process using at least a first set of one or more artificial intelligence techniques;
to categorize at least a portion of the one or more discovered process action variants into one or more groups based at least in part on historical process-related data and at least one density-based clustering algorithm, wherein the at least one density-based clustering algorithm comprises (i) scoring each of the one or more discovered process action variants based at least in part on a score associated with each step related to the given discovered process action variant, (ii) generating a z-score for each of the one or more discovered process action variants based at least in part on the score of each of the one or more discovered process action variants and at least one standard deviation calculation, and (iii) clustering at least a portion of the one or more discovered process action variants based at least in part on the z-score for each of the one or more discovered process action variants;
to determine at least one resolution action in response to at least a portion of the one or more discovered process action variants by processing data pertaining to the one or more groups using at least a second set of one or more artificial intelligence techniques;
to perform the at least one determined resolution action; and
to automatically train at least the second set of one or more artificial intelligence techniques based at least in part on the at least one determined resolution action and data pertaining to at least one outcome of performing the at least one determined resolution action.

12. The non-transitory processor-readable storage medium of claim 11, wherein processing data related to the given process using at least a first set of one or more artificial intelligence techniques comprises processing, using one or more artificial intelligence-based natural language processing techniques, at least one of data pertaining to user interactions with the given process and data pertaining to user messages associated with the given process.

13. The non-transitory processor-readable storage medium of claim 11, wherein determining at least one resolution action comprises determining, for at least a portion of the one or more discovered process action variants, at least one root cause and at least one corresponding impact.

14. The non-transitory processor-readable storage medium of claim 13, wherein processing data pertaining to the one or more groups using at least a second set of one or more artificial intelligence techniques comprises processing data pertaining to at least a portion of the at least one determined root cause and data pertaining to at least a portion of the at least one corresponding impact using at least one artificial intelligence-based decision tree simulation engine.

15. The non-transitory processor-readable storage medium of claim 11, wherein performing the at least one determined resolution action comprises automatically carrying out the at least one determined resolution action using at least one application programming interface connector in conjunction with at least one system related to the given process.

16. An apparatus comprising:
at least one processing device comprising a processor coupled to a memory;
the at least one processing device being configured:
to discover, during execution of a given process, one or more process action variants by processing data related to the given process using at least a first set of one or more artificial intelligence techniques;
to categorize at least a portion of the one or more discovered process action variants into one or more groups based at least in part on historical process-related data and at least one density-based clustering algorithm, wherein the at least one density-based clustering algorithm comprises (i) scoring each of the one or more discovered process action variants based at least in part on a score associated with each step related to the given discovered process action variant, (ii) generating a z-score for each of the one or more discovered process action variants based at least in part on the score of each of the one or more discovered process action variants and at least one standard deviation calculation, and (iii) clustering at least a portion of the one or more discovered process action variants based at least in part on the z-score for each of the one or more discovered process action variants;
to determine at least one resolution action in response to at least a portion of the one or more discovered process action variants by processing data pertaining to the one or more groups using at least a second set of one or more artificial intelligence techniques; and
to perform the at least one determined resolution action; and
to automatically train at least the second set of one or more artificial intelligence techniques based at least in part on the at least one determined resolution action and data pertaining to at least one outcome of performing the at least one determined resolution action.

17. The apparatus of claim 16, wherein processing data related to the given process using at least a first set of one or more artificial intelligence techniques comprises processing, using one or more artificial intelligence-based natural language processing techniques, at least one of data pertaining to user interactions with the given process and data pertaining to user messages associated with the given process.

18. The apparatus of claim 16, wherein determining at least one resolution action comprises determining, for at least a portion of the one or more discovered process action variants, at least one root cause and at least one corresponding impact.

19. The apparatus of claim 18, wherein processing data pertaining to the one or more groups using at least a second set of one or more artificial intelligence techniques comprises processing data pertaining to at least a portion of the at least one determined root cause and data pertaining to at least a portion of the at least one corresponding impact using at least one artificial intelligence-based decision tree simulation engine.

20. The apparatus of claim 16, wherein performing the at least one determined resolution action comprises triggering at least one robotic process automation bot to execute at least one workflow, related to the at least one determined resolution action, on at least one system related to the given process.

* * * * *